(12) United States Patent
Merrill

(10) Patent No.: US 7,464,989 B2
(45) Date of Patent: Dec. 16, 2008

(54) CHILD TRAVEL RESTRAINT SYSTEM

(75) Inventor: David Thayer Merrill, Scottsdale, AZ (US)

(73) Assignee: AmSafe Commercial Products, Elkhart, IN (US)

( * ) Notice: Subject to any disclaimer, the term of this patent is extended or adjusted under 35 U.S.C. 154(b) by 12 days.

(21) Appl. No.: 11/403,972

(22) Filed: Apr. 13, 2006

(65) Prior Publication Data

US 2007/0241596 A1    Oct. 18, 2007

(51) Int. Cl.
*B60N 2/26* (2006.01)
*A47C 7/62* (2006.01)

(52) U.S. Cl. .............................. 297/250.1; 297/188.07

(58) Field of Classification Search .............. 297/250.1, 297/188.07, 188.04, 485, 464, 188.2
See application file for complete search history.

(56) References Cited

U.S. PATENT DOCUMENTS

| | | | |
|---|---|---|---|
| 4,527,830 A | 7/1985 | Meyers | |
| 4,660,889 A | 4/1987 | Anthony et al. | |
| 4,679,852 A | 7/1987 | Anthony et al. | |
| 4,787,677 A | 11/1988 | Reighter | |
| 4,826,246 A | 5/1989 | Meeker | |
| 5,031,962 A | 7/1991 | Lee | |
| 5,039,169 A | 8/1991 | Bougher et al. | |
| 5,061,012 A | 10/1991 | Parker et al. | |
| 5,143,420 A | 9/1992 | Switlik | |
| 5,219,203 A | 6/1993 | Switlik | |
| 5,265,828 A | 11/1993 | Bennington | |
| 5,286,090 A | 2/1994 | Templin et al. | |
| 5,611,597 A * | 3/1997 | Lanz | 297/256.17 |
| 5,628,548 A | 5/1997 | Lacoste | |
| 5,695,243 A | 12/1997 | Anthony et al. | |
| 5,839,793 A | 11/1998 | Merrick et al. | |
| 5,873,635 A | 2/1999 | Merrick | |
| 5,908,223 A | 6/1999 | Miller | |
| 5,915,787 A | 6/1999 | Brookman | |
| 6,220,662 B1 | 4/2001 | Franco-Vila et al. | |
| 6,260,925 B1 | 7/2001 | Miller | |
| 6,343,837 B1 * | 2/2002 | Gage | 297/250.1 |
| 6,402,251 B1 | 6/2002 | Stoll | |
| 6,447,060 B1 | 9/2002 | Vila et al. | |
| 6,543,722 B1 | 4/2003 | Parrow et al. | |
| 6,561,588 B1 * | 5/2003 | Brady | 297/423.4 |

(Continued)

FOREIGN PATENT DOCUMENTS

EP    1193111    4/2002

OTHER PUBLICATIONS

International Search Report for Application No. PCT/US2007/66476; Applicant: AmSafe Commercial Products, Inc.; Date of Mailing: Jan. 25, 2008 (2 pages).

(Continued)

*Primary Examiner*—Milton Nelson, Jr.
(74) *Attorney, Agent, or Firm*—Perkins Coie LLP

(57) ABSTRACT

A child travel restraint system having a child safety seat adapted to be removably connected to a vehicle seat and a supplemental child restraint adapted to be stowed with the child safety seat, with the supplemental child restraint further adapted to be separated from the child safety seat and removably fastened to a vehicle passenger seat, and a method of providing a child restraint when traveling by land vehicle and by aircraft within a given trip.

9 Claims, 7 Drawing Sheets

U.S. PATENT DOCUMENTS

| | | |
|---|---|---|
| 6,616,242 B1 | 9/2003 | Stoll |
| 6,767,058 B2 | 7/2004 | McClellan-Derrickson |
| 7,029,067 B2 | 4/2006 | Vis et al. |
| 7,077,475 B2 | 7/2006 | Boyle |
| 7,159,285 B2 | 1/2007 | Karlsson |
| 7,246,854 B2 | 7/2007 | Dingman et al. |
| 2002/0000744 A1 | 1/2002 | Maciejczyk |
| 2003/0057750 A1 | 3/2003 | Blackler |
| 2008/0100051 A1 | 5/2008 | Bell et al. |
| 2008/0100122 A1 | 5/2008 | Bell et al. |

OTHER PUBLICATIONS

Wheelie Car Seat Travel Bag by JL Childress—printout from internet web site www.Go-Baby.com.

Safefit—Cover N' Carry Car Seat Protector—printout from internet web site www.Amazon.com.

Ultimate Black Car Seat Travel Bag—printout from internet web site www.target.com.

Tiny Air Travelers at Risk—printout from Brad Watson Reports—Jan. 26, 2006.

Restraint Use on Aircraft—printout from American Academy of Pediatrics vol. 108 No. 5 Nov. 2001.

Child Restraint Systems—printout from Department of Aviation Administration—Federal Aviation Administration 14 CFR.

Improving the Safety of Older-Child Passengers—Nov. 2005.

Safer Airplane Travel With Babies & Toddlers—printout from internet web site www.saferidenews.com.

* cited by examiner

CHILD TRAVEL RESTRAINT SYSTEM

BACKGROUND OF THE INVENTION

1. Field of the Invention

The present invention generally relates to restraint systems for use when traveling with a child which are designed to protect the child as a vehicle occupant. More particularly, the present invention is directed to a child travel restraint system which provides multiple configurations for use in land vehicles as well as aircraft, and to a method of providing a vehicle restraint when traveling by land vehicle and by aircraft within a given trip.

2. Discussion of the Prior Art

Restraining a child in a vehicle is critically important to their personal safety. This is true whether the child is traveling as a passenger in a land vehicle or an aircraft. In the present context, the term land vehicle is intended to include vehicles having at least one passenger seat and that are designed to travel on land, such as on dirt or on paved road surfaces, including for example, automobiles, sport utility vehicles, vans or trucks. Similarly, the term aircraft as used herein is intended to include vehicles having at least one passenger seat and that are designed to travel by air, such as commercial or private airplanes or jets.

Depending on the physical size or maturity of a child, it is common to use a portable device known as a child safety seat or car seat when restraining a child in a land vehicle. Indeed, it is common within the United States that individual States have laws that require use of a child safety seat in particular configurations when children are traveling in a land vehicle. State laws typically relate to anticipated levels of physical maturity based on age or size. For example, a State may have laws that follow recommendations from the National Highway Transportation Safety Administration (NHTSA).

The NHTSA recommends that a child from birth to at least one year old and at least twenty pounds be restrained in a child safety seat in a rearward facing direction and which is located in a rear seat of a land vehicle. This presumably is intended to protect such a small child who would not have adequate strength in the neck to resist the head potentially moving forward in a violent manner in a frontal crash or extreme braking maneuver. The NHTSA further recommends that from about age one and at least twenty pounds up until about age four and at least forty pounds, a child should be restrained in a forward facing child safety seat that is located in a rear seat of a land vehicle. Recognizing that children beyond this age and size are still at an elevated risk, the NHTSA recommends the use of a child booster seat to raise the child's pelvic region when on a seat from about age four and at least forty pounds up until the child is age eight or at least 4'9" tall. After reaching such age or size, the NHTSA recommends that a child use a lap and shoulder belt, which typically are provided as standard equipment in modern land vehicles, and that the child still be seated in a rear seat of a land vehicle until reaching the age of twelve, at which time the child may appropriately use the standard seat belt restraints in a front or rear seat of a land vehicle. These recommendations, and the State laws that are fashioned in a similar manner, ultimately are intended for the protection and well-being of children when traveling in a land vehicle, which in today's society often is a daily occurrence.

Rules also apply to the restraint of children in aircraft. For instance, the Federal Aviation Administration (FAA) requires that a very young child under age two need not be in a separate seat, and can be either held on the lap of an adult or buckled into a child safety seat, such as is used in a land vehicle, with the child safety seat installed on an aircraft passenger seat. Indeed, it is fairly widely recommended that children be in a child safety seat until the child is at least four years old and at least forty pounds. Beyond this age, a child may be seated in an aircraft passenger seat and use the standard lap belt provided by the aircraft manufacturer. Unfortunately, these rules are less than ideal for the safety of children. For instance, holding a child on an adult's lap may subject the child to a potential of being crushed by the adult's upper body in the event of a crash. Further, a relatively young child being buckled into an aircraft passenger seat by only a lap belt presents a similar physical maturity dilemma sought to be overcome in land vehicles by use of child safety seats or booster seats until an older age.

To date there is no known universal child restraint system that is capable of being configured in multiple ways so as to provide enhanced restraint safety for a child, regardless of the child's age and in which type of vehicle the child will be traveling. Accordingly, it is desirable to provide a restraint system that may be used in both land vehicles and aircraft, at a variety of child ages, and that is equipped to be configured for use in a method of travel throughout a trip, which accommodates either type of vehicle being used in a respective segment of a trip. It also is desirable to provide a way in which to convert a standard child safety seat to a more universal child travel restraint system, so as to achieve the above desirable features. Moreover, it is advantageous to provide a protective travel bag incorporated into a total child travel restraint system.

The present invention addresses shortcomings in prior art child restraint systems, while providing the above mentioned desirable features.

SUMMARY OF THE INVENTION

The purpose and advantages of the invention will be set forth in and apparent from the description and drawings that follow, as well as will be learned by practice of the invention.

The present invention is generally embodied in a child travel restraint system that is adapted for use in land vehicles, as well as aircraft. The travel restraint system also may be used to provide enhanced safety for a child from newborn to the age at which a child car or booster seat is no longer required, and potentially even beyond these early years. It is important that the system provide a means by which an adult can travel with a child on a trip that may include travel both in a land vehicle and an aircraft, and provide convenience to the adult in handling the restraint system while providing the best safety performance.

Indeed, the present invention enhances the convenience of traveling with a child safety seat by allowing an adult to check as baggage the child safety seat when a child would be better restrained in an aircraft by a supplemental child restraint. This results in more usable space in the aircraft and facilitates more efficient and economical use of appropriate child restraints by making it more likely that a child travel restraint system may travel with an adult and child rather than giving rise to the need to rent a child safety seat once arriving at a destination by air travel.

Moreover, the simple, reliable and durable structure shown associated with the invention and shown in the preferred embodiments permits intuitive, easy use of the present invention, keeping the potential child restraints together making it suitable for use in a variety of vehicles and enhancing the likelihood that children will be restrained in an appropriate manner regardless of the type of vehicle in which they may ride during a given trip.

In a first aspect of the invention, the child travel restraint system has a child safety seat adapted to be removably connected to a vehicle seat, a supplemental child restraint adapted to be stowed with the child safety seat, and the supplemental child restraint is further adapted to be separated from the child safety seat and removably fastened to a vehicle passenger seat.

In another aspect of the invention, the child travel restraint system has a child safety seat adapted to be removably connected to a vehicle seat, a travel bag adapted to receive the child safety seat, a supplemental child restraint adapted to be stowed with the child safety seat in the travel bag, and the supplemental child restraint is further adapted to be separated from the child safety seat and travel bag and removably fastened to a vehicle passenger seat.

In a further aspect of the invention, a method of providing a child restraint when traveling by land vehicle and by aircraft within a given trip is provided. The method includes the steps of providing a child safety seat adapted to be removably connected to a passenger seat in a land vehicle and to restrain a child in the child safety seat when the child is riding in the land vehicle, removing the child safety seat from the land vehicle passenger seat and entirely from the land vehicle, providing a supplemental child restraint adapted to be stowed with the child safety seat when transporting the child safety seat into an airport, deploying the supplemental child restraint from the child safety seat and having the child safety seat stowed in an aircraft, connecting the supplemental child restraint to a passenger seat within the aircraft to restrain the child in the aircraft passenger seat when the child is riding in the aircraft, disconnecting the supplemental child restraint from the aircraft passenger seat and retrieving the child safety seat from the aircraft, and removably connecting the child safety seat to a passenger seat in a second land vehicle to restrain a child in the child safety seat when the child is riding in the second land vehicle.

Thus, the present invention presents a desirable alternative to child safety seats alone as they are used in present child vehicle restraint systems. The invention permits multiple configurations, for the best safety of the child and convenience of the adult who is traveling with and is responsible for the child.

It is to be understood that both the foregoing general description and the following detailed description are exemplary and provided for purposes of explanation only, and are not restrictive of the invention, as claimed. Further features and objects of the present invention will become more fully apparent in the following description of the preferred embodiments and from the appended claims.

BRIEF DESCRIPTION OF THE DRAWINGS

In describing the preferred embodiments, reference is made to the accompanying drawing figures wherein like parts have like reference numerals, and wherein.

Figure 1A:
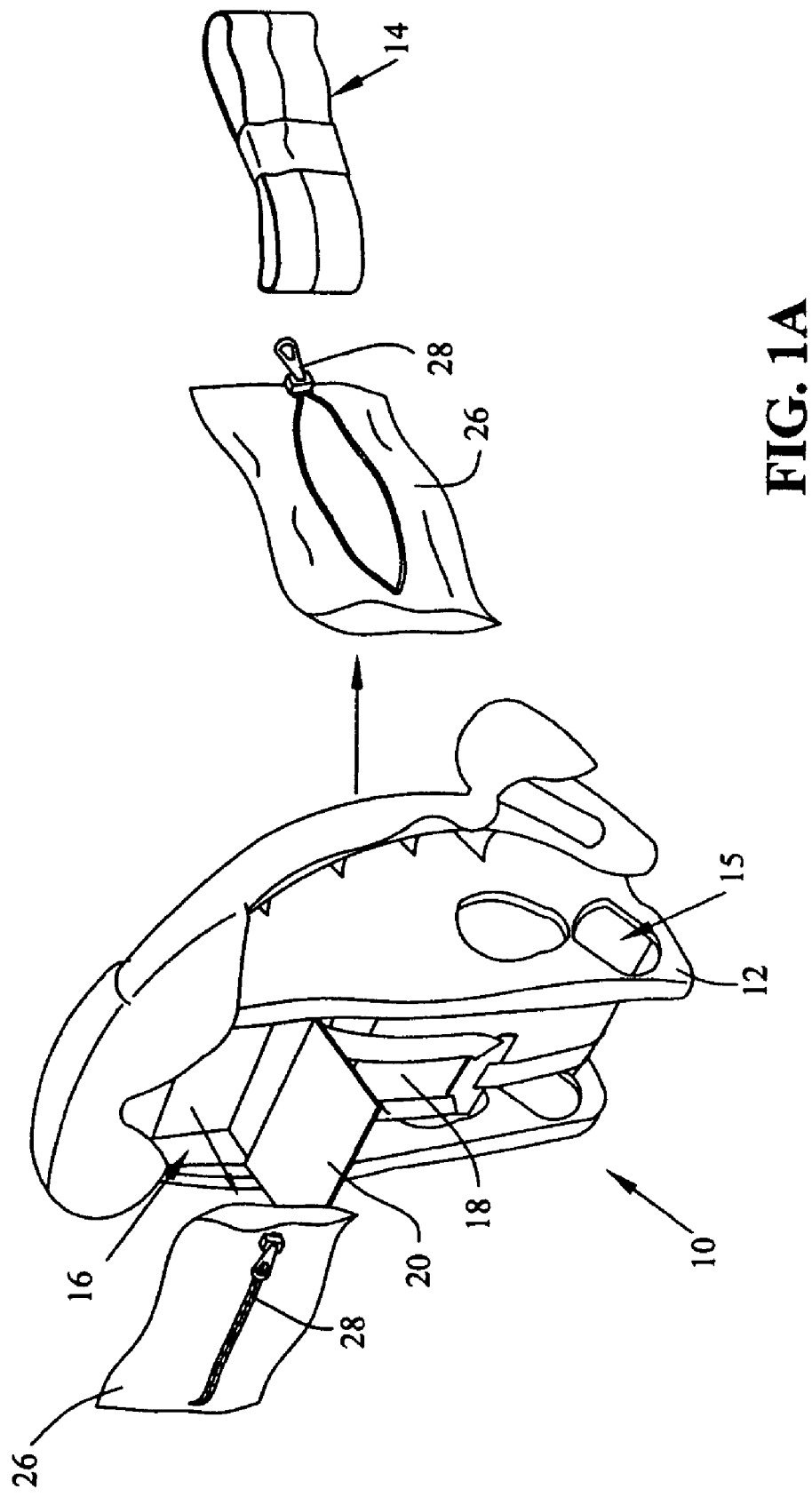
FIGS. 1A and 1B are perspective views of a first embodiment of a child travel restraint system consistent with the invention.

It should be understood that the drawings are not to scale. While considerable mechanical details of a child travel restraint system, including other plan and section views of the particular components, have been omitted, such details are considered well within the comprehension of those skilled in the art in light of the present disclosure. It also should be understood that the present invention is not limited to the preferred embodiments illustrated.

DETAILED DESCRIPTION OF THE PREFERRED EMBODIMENTS

Referring generally to FIGS. 1A-8 and upon review of this description, it will be appreciated that the child travel restraint system of the present invention generally may be embodied within numerous configurations.

Referring to a preferred embodiment in FIGS. 1A-2B, a child travel restraint system 10 includes a child safety seat 12, a supplemental child restraint 14 and a means to carry the supplemental child restraint with the child safety seat. Child safety seat 12 may take many forms and is generally of the type commonly used in land vehicles. Supplemental child restraint 14 also may take many forms an is generally of a type that may be used in an aircraft or land vehicle, such as that disclosed in U.S. Pat. No. 6,402,251.

In this embodiment, child safety seat 12 has a pair of apertures through a lower portion of the side panels to permit a seatbelt for a passenger seat to be threaded through at 15 and latched for connection to a vehicle, as is well known and common in the child safety seat art. Indeed, it will be appreciated that many different configurations are available for connection of child safety seats to vehicle passenger seats via a seatbelt. In this context, child safety seat is intended to include products that have a single seat portion, or multiple portions, such as those having a seat portion that is to be connected to a base that, in turn, is connected to a vehicle passenger seat.

Also in this embodiment, child safety seat 12 includes a compartment 16 located in a rear panel 18 of the child safety seat 12. In this example, compartment 16 has a door 20 which is pivotally mounted by a hinge 22 to rear panel 18. Door 20 has a handle 24 to be able to move between open and closed positions, with door 20 latching in the closed position via a suitable latching mechanism (not shown). Compartment 16 is provided to store supplemental restraint 14, so that it is carried with the child safety seat 12 and available for use when needed. While optional, FIGS. 1A and 1B include a further carrying case 26 which is appropriately sized to fit within compartment 16, yet also hold supplemental restraint 14. Carrying case 26 has a zipper 28 to allow supplemental restraint 14 to be placed inside or withdrawn for use as needed, and it may be conveniently carried apart from child safety seat 12.

Child safety seat 12 of child travel restraint system 10 may be buckled onto the seat bottom portion of a land vehicle seat for use when traveling over land, by passing a seatbelt through the apertures at 15 and latching the seatbelt in a customary manner. When deciding to include air travel within a trip with a child who has reached an age or size that would permit the child to travel without being in a child safety seat 12, but would still be relatively immature with respect to the normal lap belt 30 of an aircraft seat 34, child safety seat 12 may be removed from the land vehicle and transported into an airport. Compartment 16 may be opened and supplemental restraint 14 may be deployed or withdrawn for use, as shown in FIG. 1A. The supplemental restraint 14 may be stored in compartment 16 directly, or within a further container, such as carrying case 26.

Figure 1B:
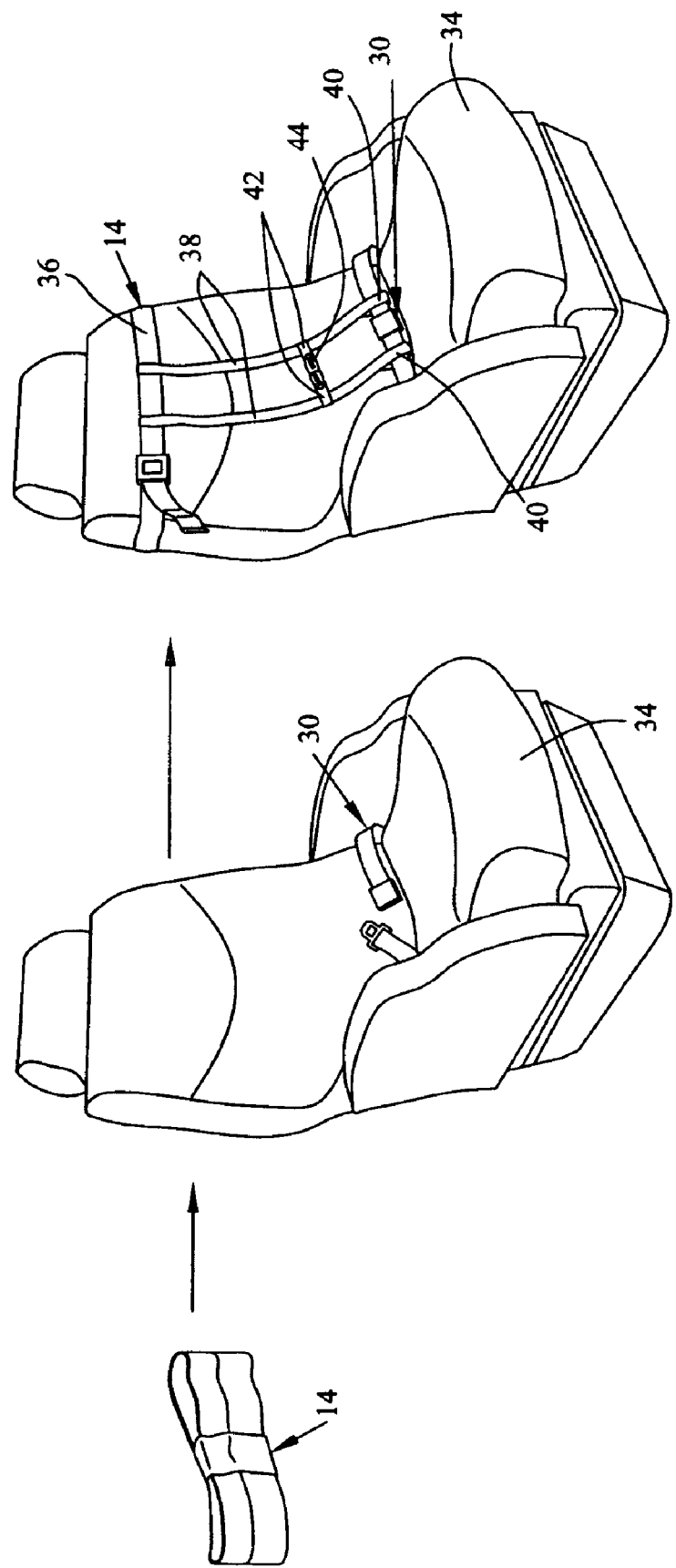
Figure 2A:
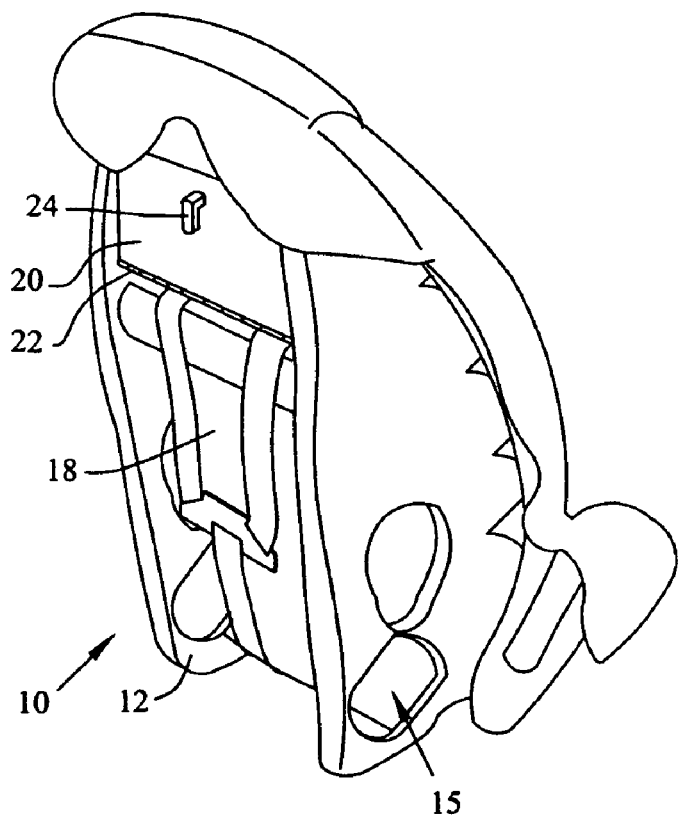
FIGS. 2A and 2B are perspective views of the child safety seat portion of the first embodiment of the child travel restraint system shown in FIGS. 1A and 1B.
Figure 2B:
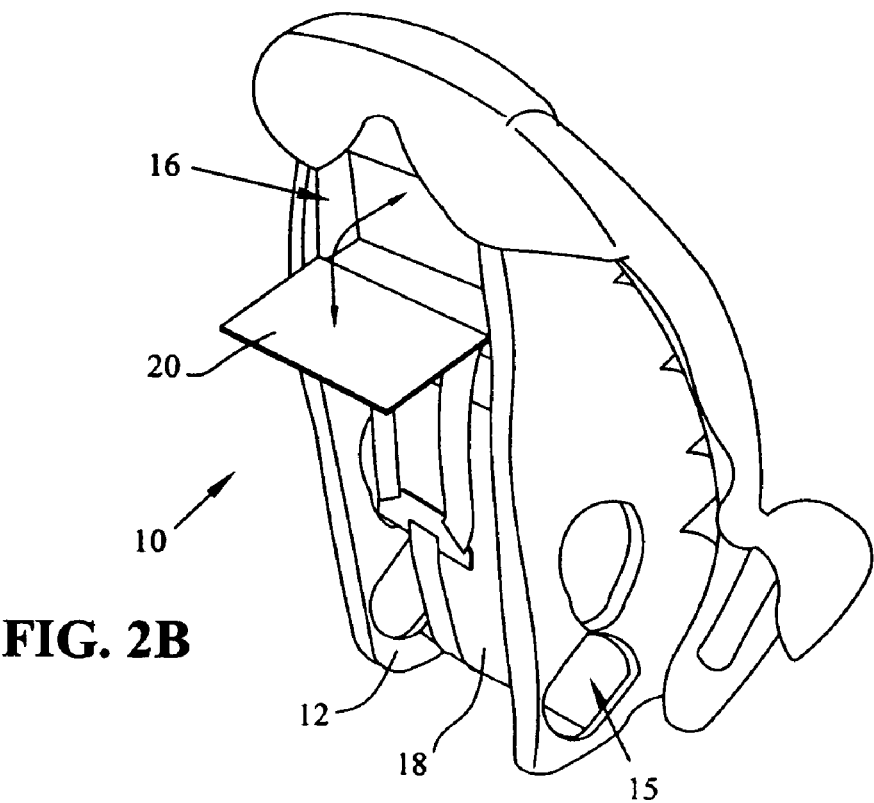

Once supplemental restraint 14 is removed from child safety seat 12, child safety seat 12 may be stowed within the aircraft, such as by checking it through as luggage for the trip if boarding a commercial flight, or otherwise stowing the child safety seat in the cargo hold of the aircraft. In turn, supplemental restraint 14 may be carried onto the aircraft to be connected to an aircraft passenger seat 34 in a manner prescribed by the manufacturer. As represented in FIG. 1B, an example supplemental restraint 14 may have an upper strap 36 for removable attachment to a seat back portion of aircraft passenger seat 34. Two straps 38 are connected to upper strap 36 and are configured to run relatively vertically and parallel to each other. The bottom of straps 38 include loops 40 through which the ends of standard lap belt 30 may be threaded. The example supplemental restraint 14 further includes horizontal straps 42 connected to vertical straps 38, and which may be connected together by a latch or buckle 44. Thus, once a child is seated, the child may be more properly secured by latching the buckle and removing the slack in the standard lap belt 30 and by latching the buckle 44 on horizontal straps 42 to essentially employ a four point safety harness.

After the child using a supplemental child restraint 14 has safely completed the air travel portion of a trip, the supplemental child restraint 14 may be removed from the aircraft passenger seat 34, and carried off the aircraft. Upon retrieving the child safety seat 12, the supplemental child restraint 14 may again be stowed within the rear compartment 16, and child safety seat 12 may be connected to a passenger seat in a land vehicle for use at the final destination.

In time, it may be that such a supplemental child restraint 14 will be tested and recommended for use in land vehicles as well. In that event, such a supplemental child restraint 14 may be deployed from a child safety seat 12 for more consistent use in both land vehicles and aircraft.

Figure 3A:
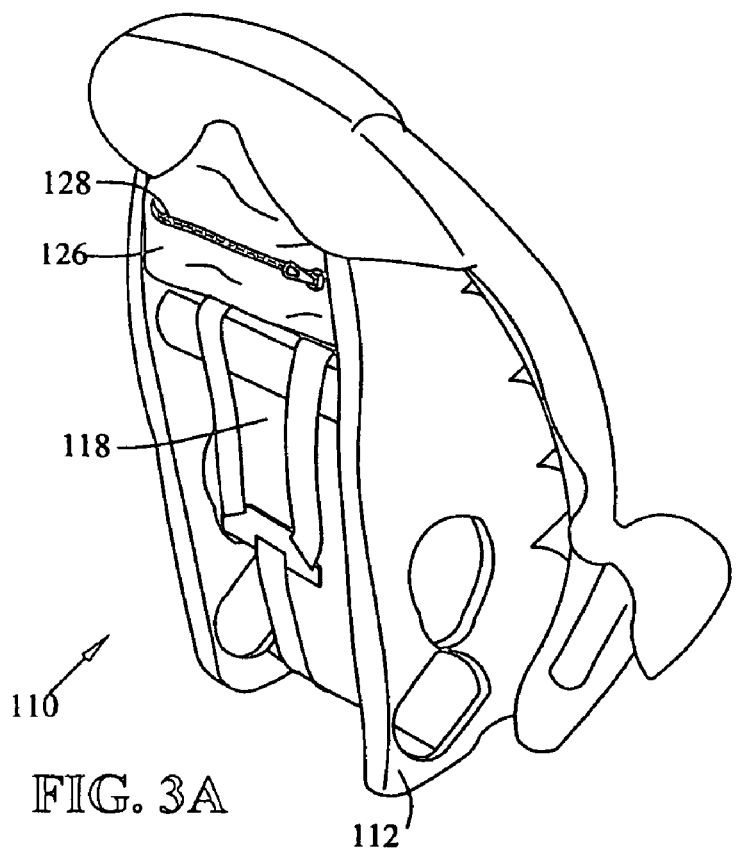
FIGS. 3A and 3B are perspective views of a child safety seat portion of a second embodiment of a child travel restraint system consistent with the invention.
Figure 3B:
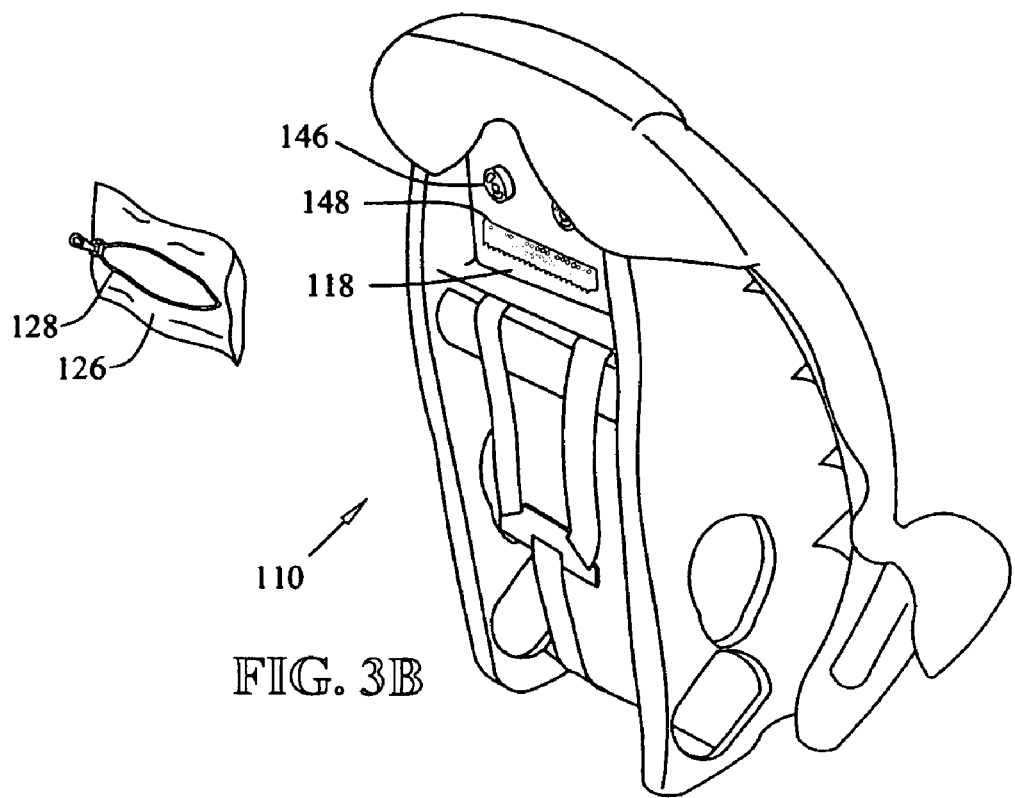

Turning to FIGS. 3A and 3B, a second embodiment of a child travel restraint system 110 is shown with child safety seat 112 having a pouch, compartment, or carrying case 126 connected to a rear panel 118. Pouch 126 is configured to be resealable with a zipper 128, and to accept and hold a supplemental child restraint (not shown), comparable to that of the first embodiment. Pouch 126 may be directly and permanently affixed to child safety seat 112. Alternatively, it may be removably connected to the rear of child safety seat 112, such as by fasteners in the form of snaps 146, hook and loop fastener 148, or any combination thereof or suitable alternatives thereto. This alternative embodiment of a child travel restraint system 110 may be used in a similar manner to that of the first embodiment shown in FIGS. 1A-2B.

Figure 4:
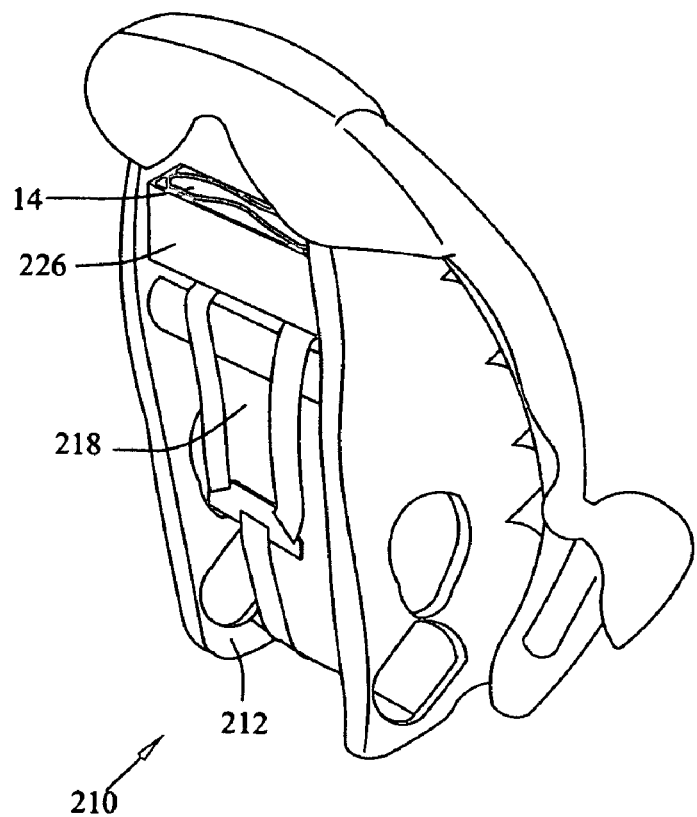
FIG. 4 is a perspective view of a child safety seat portion of a third embodiment of a child travel restraint system consistent with the invention.

A third embodiment of a child travel restraint system 210 is shown in FIG. 4. This embodiment has an alternative way of holding a supplemental child restraint 14 adjacent the rear of a child safety seat 212. A holder 226 has an open slot at its upper end and a bottom at its lower end, forming a compartment to receive and hold a supplemental child restraint 14. Similar to pouch 126, holder 226 may be permanently affixed or removably connected to the rear of child safety seat 212 by suitable fastening means. This third embodiment of a child travel restraint system 210 also may be used in a similar manner to that of the first embodiment.

Figure 5:
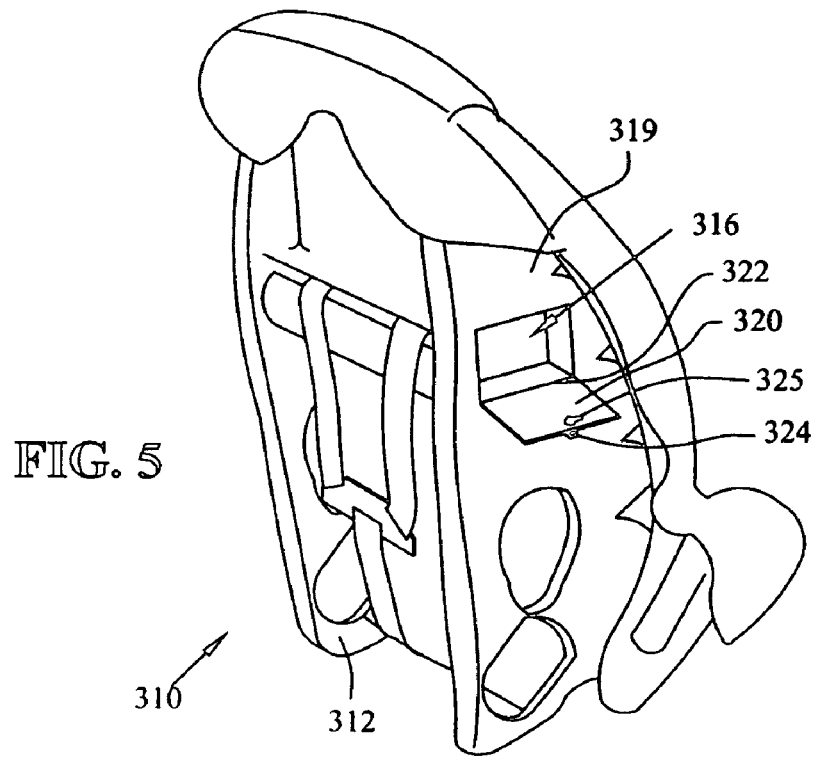
FIG. 5 is a perspective view of a child safety seat portion of a fourth embodiment of a child travel restraint system consistent with the invention.

In FIG. 5, a fourth embodiment of a child travel restraint system 310 is shown with a compartment 316 located in a side panel 319 of a child safety seat 312. In this embodiment, compartment 316 has a door 320 which is pivotally mounted to side panel 319 by a continuous hinge 322 formed in the plastic. Door 320 has a handle 324 to be able to move between open and closed positions, with door 320 latching in the closed position via rotation of handle 324 to engage latching mechanism 325. Compartment 316 is provided to store a supplemental restraint (not shown), so as to be carried with the child safety seat 312 when not in use and to be readily available for use when needed. In this embodiment, the supplemental restraint may be stowed directly, or within a suitable carrying case such as is shown in FIGS. 1A and 1B.

Figure 6:
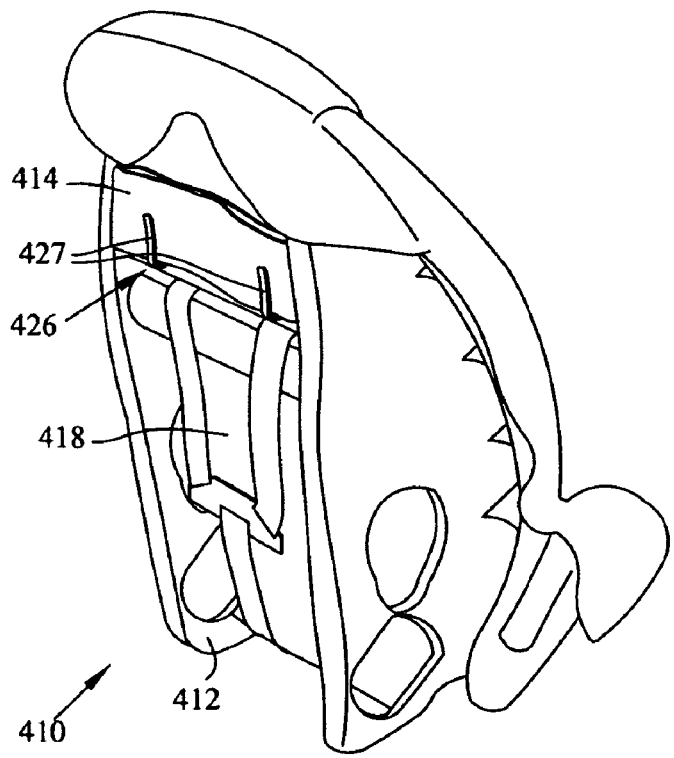
FIG. 6 is a perspective view of a child safety seat portion of a fifth embodiment of a child travel restraint system consistent with the invention.

Turning to FIG. 6, a fifth embodiment of a child travel restraint system is shown with an alternative way of holding a supplemental child restraint 14 adjacent the rear of a child safety seat 412. A holder 426 has a pair of holding fingers 427 which may be formed into the rear panel 418 of child safety seat 412, or may be formed together or individually so as to clip into apertures or otherwise be fastened to rear panel 418. In either event, fingers 427 serve to receive and hold a supplemental child restraint 14. This fifth embodiment of a child travel restraint system 410 also may be used in a similar manner to that of the first embodiment in land vehicles and aircraft.

Figure 7:
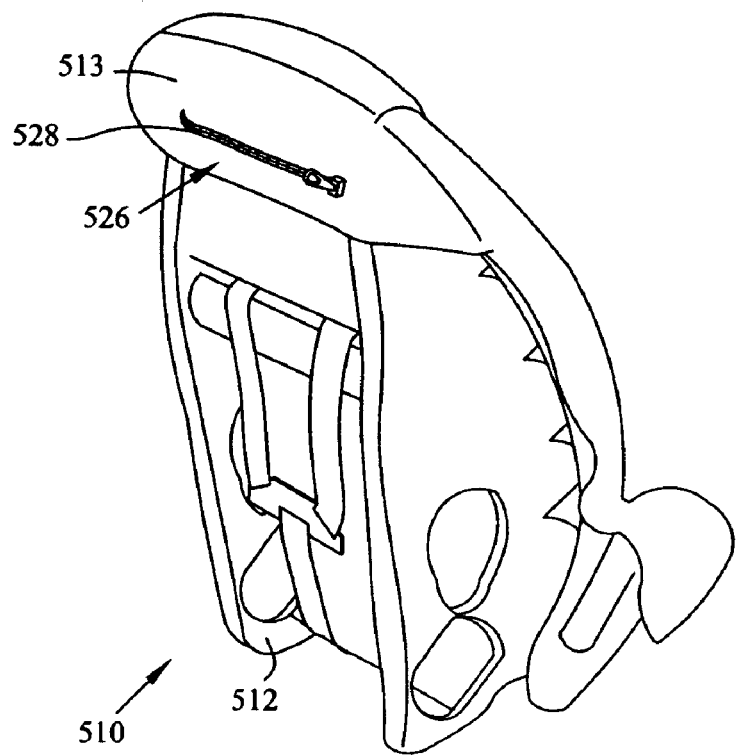
FIG. 7 is a perspective view of a child safety seat portion of a sixth embodiment of a child travel restraint system consistent with the invention.

FIG. 7 shows a sixth embodiment of a child travel restraint system 510. In FIG. 7, child safety seat 512 has a fabric seat cover 513 which is stretched over the seat to provide greater comfort for a child passenger. Seat cover 513 includes an internal pouch or compartment 526 with a reclosable zipper 528 to access a supplemental restraint in pouch 526. It will be appreciated that an integral reclosable pouch or compartment may be provided in the seat cover in alternative configurations, such as along the sides of child safety seat 512 or elsewhere, and by fasteners such as a zipper, snaps, hook and loop fasteners, or other suitable components.

Figure 8:
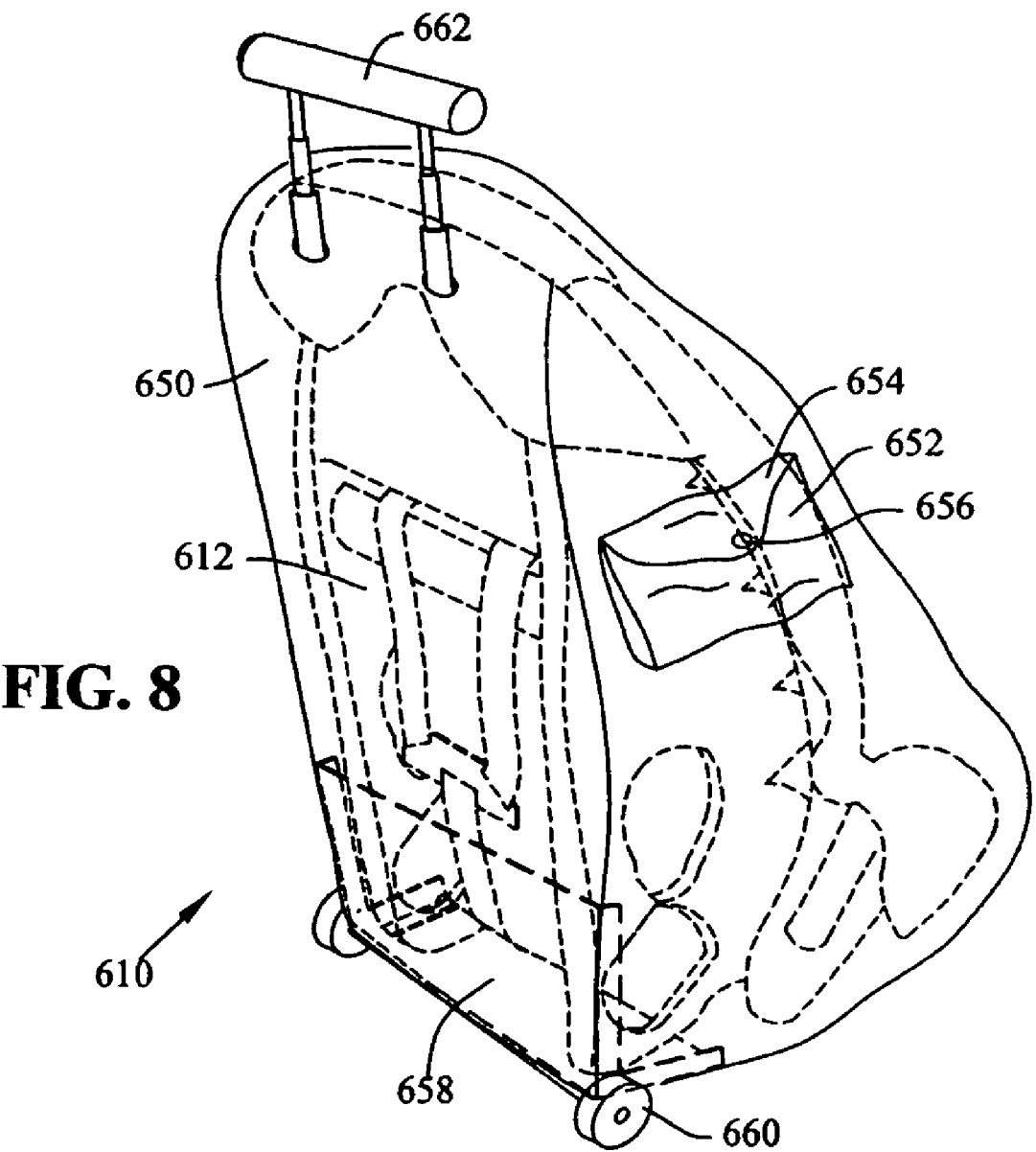
FIG. 8 is a perspective view of a seventh embodiment of a child travel restraint system consistent with the invention.

FIG. 8 presents a seventh embodiment of a child travel restraint system 610. In this embodiment, a travel bag 650 is provided to enhance the ease with which child safety seat 612 can be transported by a user, such as when walking through an airport. Travel bag 650 also provides further protection to child safety seat 612 when checking the seat through as luggage. Importantly, because a supplemental restraint (not shown) would normally be used when child safety seat 612 is being stowed in travel bag 650, the supplemental restraint may be stored in travel bag 650, such as within the interior of the bag loosely or in a separate compartment or other holder, or within a compartment on the outside of travel bag 650, such as pouch 652. Pouch 652 may have various configurations, such as having a closable flap 654 with a suitable fastener, such as snap 656 or the like. A supplemental restraint may be stowed or removed when it will be needed and prior to checking travel bag 650 and child safety seat 612 as luggage.

Travel bag 650 may be made of various materials, whether vinyl, nylon, fabric or any other suitable material and in an appropriate configuration to perform the desired storage and transportation functions. The convenience of child travel restraint system 610 may be enhanced by including a protective rear skid plate 658 on travel bag 650. The skid plate may be made of plastic or other relatively rigid suitable materials, and may be configured to support axles for rotatable elements such as rollers or wheels 660. To further increase the convenience, travel bag 650 also may have a carrying or tow strap or a handle, such as the retractable, telescopic handle 662. It will be appreciated that a handle or tow strap may be configured in various ways, whether of flexible or rigid materials.

It will be appreciated that a child travel restraint system in accordance with the present invention may be provided in various configurations that will offer the opportunity to use a child safety seat in its standard configuration or to choose to use a supplemental restraint for alternative connection to a vehicle seat, as appropriate. Any variety of suitable materials of construction, configurations, shapes and sizes for the components and methods of connecting the components may be utilized to meet the particular needs and requirements of an end user. It will be apparent to those skilled in the art that various modifications can be made in the design and construction of such a child travel restraint system without departing from the scope or spirit of the present invention, and that the claims are not limited to the preferred embodiments illustrated.

What is claimed is:

1. A method of providing a child restraint when traveling by land vehicle and by aircraft within a given trip, comprising the steps of:
    providing a child safety seat adapted to be removably connected to a passenger seat in a first land vehicle and to restrain a child in the child safety seat when the child is riding in the first land vehicle;
    removing the child safety seat from the first land vehicle passenger seat and entirely from the first land vehicle;
    providing a supplemental child restraint adapted to be stowed with the child safety seat when transporting the child safety seat into an airport;
    deploying the supplemental child restraint from the child safety seat and stowing the child safety seat in an aircraft;
    connecting the supplemental child restraint to a passenger seat within the aircraft;
    restraining the child in the aircraft passenger seat by the supplemental child restraint when the child is riding in the aircraft;
    removing the child from the supplemental child restraint and the aircraft passenger seat;
    disconnecting the supplemental child restraint from the aircraft passenger seat and retrieving the child safety seat from the aircraft;
    removably connecting the child safety seat to a passenger seat in a second land vehicle to restrain the child in the child safety seat when the child is riding in the second land vehicle.

2. A method of providing a child restraint when traveling by land vehicle and by aircraft within a given trip in accordance with claim 1, further comprising the step of placing the child safety seat in a travel bag before stowing the child safety seat in the aircraft.

3. A method of providing a child restraint when traveling by land vehicle and by aircraft within a given trip in accordance with claim 2, wherein the step of deploying the supplemental child restraint from the child safety seat includes removing the supplemental child restraint from the travel bag before stowing the child safety seat in the aircraft.

4. A method of providing a child restraint when traveling by land vehicle and by aircraft within a given trip in accordance with claim 1, wherein the step of connecting the supplemental child restraint to a passenger seat within the aircraft includes use of a seatbelt on an aircraft passenger seat.

5. A method of providing a child restraint when traveling by land vehicle and by aircraft within a given trip in accordance with claim 1, wherein the child safety seat is to be connected to the passenger seat in the first land vehicle by connection to a seatbelt in the first land vehicle.

6. A method of providing a child restraint when traveling by land vehicle and by aircraft within a given trip in accordance with claim 1, wherein providing the supplemental child restraint adapted to be stowed with the child safety seat includes storing the supplemental child restraint in a compartment in the child safety seat.

7. A method of providing a child restraint when traveling by land vehicle and by aircraft within a given trip in accordance with claim 6, wherein storing the supplemental child restraint in the compartment includes storing the supplemental child restraint in at least one of a side panel compartment and in a back panel compartment of the child safety seat.

8. A method of providing a child restraint when traveling by land vehicle and by aircraft within a given trip in accordance with claim 1, wherein providing the supplemental child restraint adapted to be stowed with the child safety seat includes removably attaching the supplemental child restraint to the child safety seat.

9. A method of providing a child restraint when traveling by land vehicle and by aircraft within a given trip in accordance with claim 1, wherein providing the supplemental child restraint adapted to be stowed with the child safety seat includes storing the child restraint in a carrying case.

* * * * *